(12) United States Patent
Um et al.

(10) Patent No.: US 12,148,403 B2
(45) Date of Patent: Nov. 19, 2024

(54) DISPLAY PANEL AND DISPLAY DEVICE (71) Applicant: TCL China Star Optoelectronics Technology Co., Ltd., Shenzhen (CN)

(72) Inventors: Yoonsung Um, Shenzhen (CN); Jing Liu, Shenzhen (CN); Kaili Qu, Shenzhen (CN); Qi Zhang, Shenzhen (CN); Chuwei Liang, Shenzhen (CN)

(73) Assignee: TCL China Star Optoelectronics Technology Co., Ltd., Shenzhen (CN)

( * ) Notice: Subject to any disclaimer, the term of this patent is extended or adjusted under 35 U.S.C. 154(b) by 0 days.

(21) Appl. No.: 17/622,114

(22) PCT Filed: Nov. 12, 2021

(86) PCT No.: PCT/CN2021/130413
§ 371 (c)(1),
(2) Date: Dec. 22, 2021

(87) PCT Pub. No.: WO2023/050540
PCT Pub. Date: Apr. 6, 2023

(65) Prior Publication Data
US 2024/0029681 A1 Jan. 25, 2024

(30) Foreign Application Priority Data

Sep. 30, 2021 (CN) .......................... 202111163366.7

(51) Int. Cl.
*G09G 3/36* (2006.01)
(52) U.S. Cl.
CPC ......... *G09G 3/3614* (2013.01); *G09G 3/3648* (2013.01); *G09G 2300/0852* (2013.01);
(Continued)

(58) Field of Classification Search
CPC .............. G09G 3/3614; G09G 3/3648; G09G 2300/0852; G09G 2320/0209;
(Continued)

(56) References Cited

U.S. PATENT DOCUMENTS

2010/0315321 A1* 12/2010 Huang ................. G09G 3/3659
345/94
2014/0022286 A1* 1/2014 Chen .................... G09G 3/2003
345/55

(Continued)

FOREIGN PATENT DOCUMENTS

CN 101446723 A 6/2009
CN 105911780 A 8/2016
(Continued)

OTHER PUBLICATIONS

International Search Report in International application No. PCT/CN2021/130413, mailed on Jun. 24, 2022.
(Continued)

*Primary Examiner* — Amy Onyekaba
(74) *Attorney, Agent, or Firm* — PV IP PC; Wei Te Chung (57) ABSTRACT

A display panel includes a plurality of data lines, a plurality of scan lines, a plurality of share bar groups, and a plurality of pixel units. Each of the share bar groups includes a first share bar and a second share bar. Each of the pixel units includes a first thin-film transistor, a second thin-film transistor, and a share thin-film transistor. The first thin-film transistor and the second thin-film transistor are electrically connected to a same one of the data lines. The first thin-film transistor, the second thin-film transistor, and the share thin-film transistor are electrically connected to a same one (Continued)

of the scan lines. The share thin-film transistor is electrically connected to the second thin-film transistor and one of the share bar groups.

20 Claims, 7 Drawing Sheets

(52) U.S. Cl.
CPC .............. *G09G 2320/0209* (2013.01); *G09G 2320/0242* (2013.01); *G09G 2320/028* (2013.01)

(58) Field of Classification Search
CPC ..... G09G 2320/0242; G09G 2320/028; G09G 2300/0426; G02F 1/136286; G02F 1/13624; G02F 1/1368; G02F 1/1343
See application file for complete search history.

(56) References Cited

U.S. PATENT DOCUMENTS

| | | | |
|---|---|---|---|
| 2014/0218655 A1 | 8/2014 | Jeong | |
| 2015/0364069 A1* | 12/2015 | Chen | G09G 3/3413 345/205 |
| 2016/0203781 A1* | 7/2016 | Jeong | G09G 3/3696 345/208 |
| 2016/0238904 A1 | 8/2016 | Lee | |
| 2018/0294281 A1* | 10/2018 | Gan | G02F 1/136213 |
| 2018/0315386 A1* | 11/2018 | Gan | G09G 3/3648 |
| 2018/0342214 A1* | 11/2018 | Ying | G02F 1/136286 |
| 2018/0373105 A1* | 12/2018 | Zhang | G09G 3/3648 |
| 2019/0051258 A1* | 2/2019 | Chen | G09G 3/3696 |
| 2019/0164994 A1* | 5/2019 | Gan | G09G 3/20 |
| 2021/0210045 A1* | 7/2021 | Huang | G09G 3/3685 |
| 2021/0318579 A1* | 10/2021 | Chen | G09G 3/3655 |
| 2022/0308407 A1* | 9/2022 | Um | G02F 1/136286 |

FOREIGN PATENT DOCUMENTS

| | | |
|---|---|---|
| CN | 106855668 A | 6/2017 |
| CN | 107272237 A | 10/2017 |
| CN | 107515499 A | 12/2017 |
| CN | 111326122 A | 6/2020 |
| CN | 112198726 A | 1/2021 |
| CN | 112799255 A * | 5/2021 |
| CN | 113253527 A | 8/2021 |
| KR | 20060121744 A | 11/2006 |
| KR | 20130084811 A | 7/2013 |

OTHER PUBLICATIONS

Written Opinion of the International Search Authority in International application No. PCT/CN2021/130413, mailed on Jun. 24, 2022.
Chinese Office Action issued in corresponding Chinese Patent Application No. 202111163366.7 dated Jun. 15, 2022, pp. 1-10.
Korean Office Action issued in corresponding Korean Patent Application No. 10-2022-7006818 dated Aug. 14, 2023, pp. 1-9.
Japanese Office Action issued in corresponding Japanese Patent Application No. 特願2021-569198 dated Nov. 7, 2023, pp. 1-5.

* cited by examiner

DISPLAY PANEL AND DISPLAY DEVICE

CROSS-REFERENCE TO RELATED APPLICATION

This application is a national phase application under 35 U.S.C. § 371 of PCT Application No. PCT/CN2021/130413, filed Nov. 12, 2021, which claims priority to Chinese Application No. 202111163366.7, filed Sep. 30, 2021, the contents of which are incorporated herein by reference in their entirety.

FIELD OF INVENTION

The present invention is related to the field of display technology and specifically to a display panel and a display device.

BACKGROUND OF INVENTION

Liquid crystal displays (LCD) have characteristics of low power consumption, thinness, and low driving voltage, and are currently the most widely used display devices. A display region of a liquid crystal display generally includes a plurality of pixel regions. A thin-film transistor (TFT) and a pixel electrode are disposed in each of the pixel regions. The thin-film transistor is configured as a switching element, which can drive the pixel electrode to control an electric field of each of the pixel regions, thereby achieving deflection controls of liquid crystals of the liquid crystal display. The liquid crystal display with the thin-film transistor forms an active-matrix liquid crystal display, which is suitable for large-screen, high-resolution, and multi-gray-scale display requirements.

Currently, the liquid crystal displays are developing in directions of high contrast, no grayscale inversion, high brightness, high saturation, fast response, and wide viewing angle. Common wide viewing angle displays include twisted nematic (TN) liquid crystal displays with wide viewing angle films, in-plate switching (IPS) liquid crystal displays, fringe field switching (FFS) liquid crystal displays, and multi-domain vertical alignment (MVA) liquid crystal displays. In a multi-domain vertical alignment liquid crystal display, alignment patterns, such as alignment protrusions or slits, can make the liquid crystals in each of the pixel regions be arranged in multiple directions. Since the multi-domain vertical alignment liquid crystal display has alignment domains in different directions, it can meet the requirements of the wide viewing angle displays.

When a user views a same image displayed by the multi-domain vertical alignment liquid crystal display at different viewing angles, a saturation of the image seen by the user will be different, which is so-called color shift.

In order to improve this color shift problem in the prior art, a design of a display panel in which a pixel unit of each of the pixel regions has two different voltage regions is proposed. This design is mainly to provide two pixel electrodes in the pixel unit, and make the two pixel electrodes have different voltages through different driving configurations.

Figure 1:
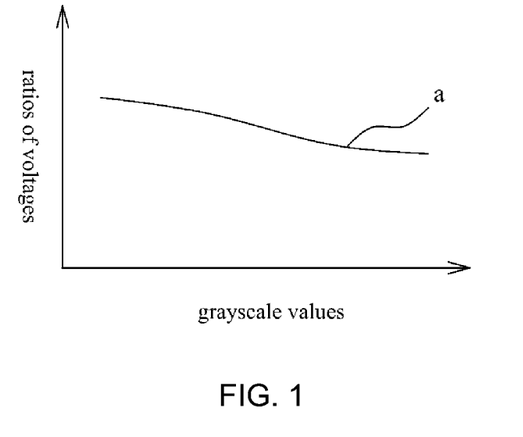
FIG. 1 is a graph of ratios of voltages of two pixel electrodes of a pixel unit of a display panel in the prior art at different grayscale values.

Please refer to FIG. 1, which is a graph of ratios of voltages of the two pixel electrodes of the pixel unit of the display panel in the prior art at different grayscale values. In order to meet requirements of a gamma curve, the voltage ratios should show an upward trend in a curve a of the different grayscale values. However, it can be seen from FIG. 1, the voltage ratios show a downward trend in the curve a of the different grayscale values. Therefore, this design will reduce a light transmittance of the multi-domain vertical alignment liquid crystal display during a high grayscale display.

SUMMARY OF INVENTION

The present invention provides a display panel and a display device using the display panel, which can prevent a color shift problem of the display device. Furthermore, the display panel of the present invention can increase viewing angles of the display device during a low grayscale display, and can increase a light transmittance of the display device during a high grayscale display.

The display panel of the present invention includes a plurality of data lines, a plurality of scan lines, a plurality of share bar groups, and a plurality of pixel units. Each of the share bar groups includes a first share bar and a second share bar. Each of the pixel units includes a first thin-film transistor, a second thin-film transistor, and a share thin-film transistor. The first thin-film transistor and the second thin-film transistor are electrically connected to a same one of the data lines. The first thin-film transistor, the second thin-film transistor, and the share thin-film transistor are electrically connected to a same one of the scan lines. The share thin-film transistor is electrically connected to the second thin-film transistor and one of the share bar groups.

In an embodiment, the first share bars of the share bar groups are electrically connected to each other, and the second share bars of the share bar groups are electrically connected to each other.

In an embodiment, a source of the first thin-film transistor and a source of the second thin-film transistor are electrically connected to a same one of the data lines, a gate of the first thin-film transistor, a gate of the second thin-film transistor, and a gate of the share thin-film transistor are electrically connected to a same one of the scan lines, a source of the share thin-film transistor is electrically connected to a drain of the second thin-film transistor, and a drain of the share thin-film transistor is electrically connected to one of the first share bar or the second share bar.

In an embodiment, in one column of the pixel units, the share thin-film transistors of the pixel units are electrically connected to a same one of the shar bar groups.

In an embodiment, in the one column of the pixel units, ones of the share thin-film transistors of every two adjacent pixel units are electrically connected to the first share bar of the same one of the shar bar groups.

In an embodiment, in the one column of the pixel units, the other ones of the share thin-film transistors of every two adjacent pixel units are electrically connected to the second share bar of the same one of the shar bar groups.

In an embodiment, in one row of the pixel units, ones of the share thin-film transistors of every two adjacent pixel units are electrically connected to the first share bar of one of the shar bar groups.

In an embodiment, in the one row of the pixel units, the other ones of the share thin-film transistors of every two adjacent pixel units are electrically connected to the second share bar of the other one of the shar bar groups.

In an embodiment, in one row of the pixel units, the share thin-film transistors of the pixel units are electrically connected to the first share bar of each of the shar bar groups.

In an embodiment, in one row of the pixel units, the share thin-film transistors of the pixel units are electrically connected to the second share bar of each of the shar bar groups.

In an embodiment, each of the pixel units further includes a first pixel electrode and a second pixel electrode. The first pixel electrode is electrically connected to the first thin-film transistor, and the second pixel electrode is electrically connected to the second thin-film transistor.

In an embodiment, in one column of the pixel units, the first share bar and the second share bar of each of the share bar groups are insulated from each other and are disposed in a middle region of the first pixel electrodes and the second pixel electrodes of the pixel units.

In an embodiment, in the one column of the pixel units, the first share bar and the second share bar of each of the share bar groups are insulated from each other and are disposed on a center line of the first pixel electrodes and the second pixel electrodes of the pixel units.

In an embodiment, in one column of the pixel units, the first share bar and the second share bar of each of the share bar groups are insulated from each other and are disposed in edge regions of the first pixel electrodes and the second pixel electrodes of the pixel units.

In an embodiment, in the one column of the pixel units, the first share bar and the second share bar of each of the share bar groups are insulated from each other and are disposed at two opposite sides of the first pixel electrodes and the second pixel electrodes of the pixel units.

The display device of the present invention includes the display panel according to any one of the above embodiments. The display panel is driven by the display device through a dot inversion mode or a row inversion mode.

In an embodiment, the first share bars of the share bar groups are electrically connected to each other, and the second share bars of the share bar groups are electrically connected to each other.

In an embodiment, a source of the first thin-film transistor and a source of the second thin-film transistor are electrically connected to a same one of the data lines, a gate of the first thin-film transistor, a gate of the second thin-film transistor, and a gate of the share thin-film transistor are electrically connected to a same one of the scan lines, a source of the share thin-film transistor is electrically connected to a drain of the second thin-film transistor, and a drain of the share thin-film transistor is electrically connected to one of the first share bar or the second share bar.

In an embodiment, in one column of the pixel units, the share thin-film transistors of the pixel units are electrically connected to a same one of the shar bar groups.

In an embodiment, each of the pixel units further includes a first pixel electrode and a second pixel electrode, the first pixel electrode is electrically connected to the first thin-film transistor, and the second pixel electrode is electrically connected to the second thin-film transistor.

The display panel and the display device of the present invention are provided with the share thin-film transistor of each of the pixel units and the first share bar and the second share bar of each of the share bar groups to prevent the color shift problem from occurring to the display panel. Therefore, the viewing angles of the display panel during the low grayscale display is increased, and the light transmittance of the display panel during the high grayscale display is increased. Furthermore, the display panel can further be applied to the display device adopting the dot inversion mode and the display device adopting the row inversion mode. In the display panel with frequent signal communication, the display panel can reduce a capacitive coupling effect generated by each of the share bar groups and the pixel units, thereby achieving desired display effects, such as low color shift, wide viewing angles during the low grayscale display, and high light transmittance in the high grayscale display.

DETAILED DESCRIPTION OF EMBODIMENTS

In order to make the above purposes, features, and advantages of the present invention more obvious and understandable, the following is a detailed description of preferred embodiments of the present invention in conjunction with accompanying drawings.

The present invention provides a display panel. Please refer to FIG. 2, which is a partial circuit diagram of the display panel of the present invention. The present invention uses the partial circuit diagram shown in FIG. 2 as an example to illustrate relative relationships between various components in the display panel.

Figure 2:
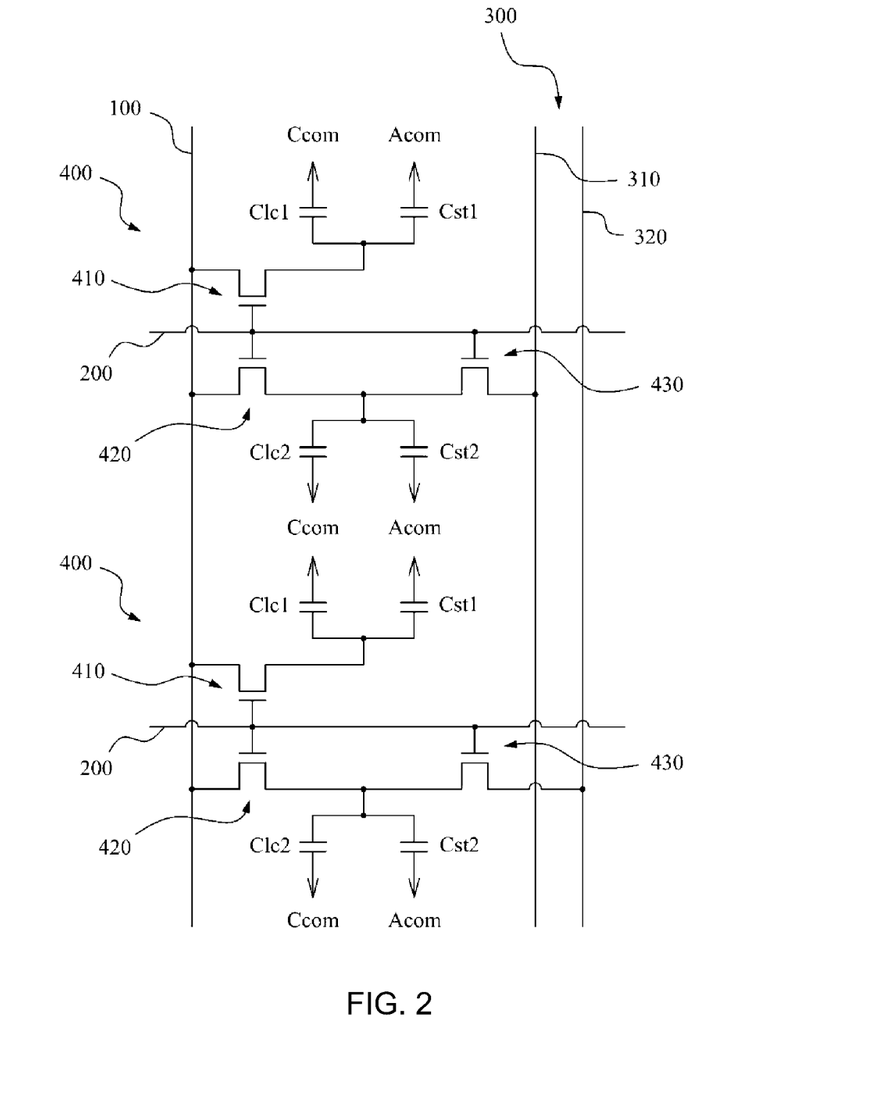
FIG. 2 is a partial circuit diagram of a display panel of the present invention.

As shown in FIG. 2, the display panel includes a plurality of data lines 100 (the partial circuit diagram of FIG. 2 only shows one of the data lines 100), a plurality of scan lines 200, and a plurality of pixel units 400. Each of the pixel units 400 of the display panel includes a first thin-film transistor 410 and a second thin-film transistor 420. In each of the pixel units 400, the first thin-film transistor 410 and the second thin-film transistor 420 are electrically connected to a same one of the data lines 100, and the first thin-film transistor 410 and the second thin-film transistor 420 are electrically connected to a same one of the scan lines 200. The first thin-film transistor 410 is further electrically connected to a first liquid crystal capacitor Clc1 and a first storage capacitor Cst1. The second thin-film transistor 420 is further electrically connected to a second liquid crystal capacitor Clc2 and a second storage capacitor Cst2. The first liquid crystal capacitor Clc1 and the second liquid crystal capacitor Clc2 are electrically connected to a color filter substrate common electrode Ccom. The first storage capacitor Cst1 and the second storage capacitor Cst2 are electrically connected to an array substrate common electrode Acom.

In order to achieve a multi-domain display in the present invention, each of the pixel units 400 further includes a share thin-film transistor 430. As shown in FIG. 2, in each of the pixel units 400, the share thin-film transistor 430 is electrically connected to the second thin-film transistor 420. The first thin-film transistor 410, the second thin-film transistor 420, and the share thin-film transistor 430 are electrically connected to a same one of the scan lines 200. When the display panel is operating, the share thin-film transistor 430 can draw out part of a voltage of the second thin-film transistor 420, so that the first thin-film transistor 410 and the second thin-film transistor 420 of each of the pixel units 400 can form two different voltage regions. The two different voltage regions can drive liquid crystals positioned at each of the pixel units 400 to perform the multi-domain display, thereby increasing viewing angles of the display panel.

However, in a traditional multi-domain display, two different voltage regions generated by a share thin-film transistor in one pixel unit are prone to crosstalk phenomenon, which affects a display effect. Therefore, as shown in FIG. 2, in the present invention, the display panel further includes a plurality of share bar groups 300 (the partial circuit diagram of FIG. 2 only shows one of the share bar groups 300), and one of the share bar groups 300 is electrically connected to the share thin-film transistor 430. Through the configuration of the share bar groups 300, the part of the voltage of the second thin-film transistor 420 is drawn out independently of the color filter substrate common electrode Ccom and the array substrate common electrode Acom, so the possible crosstalk phenomenon of the first thin-film transistor 410 and the second thin-film transistor 420 is prevented from occurring to the display panel.

Furthermore, as shown in FIG. 2, each of the share bar groups 300 includes a first share bar 310 and a second share bar 320. A source of the first thin-film transistor 410 and a source of the second thin-film transistor 420 are electrically connected to a same one of the data lines 100. A gate of the first thin-film transistor 410, a gate of the second thin-film transistor 420, and a gate of the share thin-film transistor 430 are electrically connected to a same one of the scan lines 200. A source of the share thin-film transistor 430 is electrically connected to a drain of the second thin-film transistor 420. A drain of the share thin-film transistor 430 is electrically connected to one of the first share bar 310 or the second share bar 320 of one of the share bar groups 300.

When the display panel adopts a dot inversion mode or a row inversion mode, two adjacent pixel units 400 will have different polarities. If two share thin-film transistors 430 of the two adjacent pixel units 400 with different polarities are electrically connected to a same share bar of one of the share bar groups 300, it will produce the capacitive coupling effect, in turn, causes the display panel to display abnormally. In the display panel adopting the dot inversion mode or the row inversion mode, signal exchanges in the same share bar electrically connected to the two share thin-film transistors 430 of the two adjacent pixel units 400 with different polarities is frequent, so the display panel is also prone to delayed display.

Therefore, the display panel of the present invention electrically connects the two adjacent pixel units 400 with different polarities to the first share bar 310 and the second share bar 320 of each of the share bar groups 300 individually, so as to prevent the above-mentioned display abnormalities and delayed display problems of the display panel.

Figure 3:
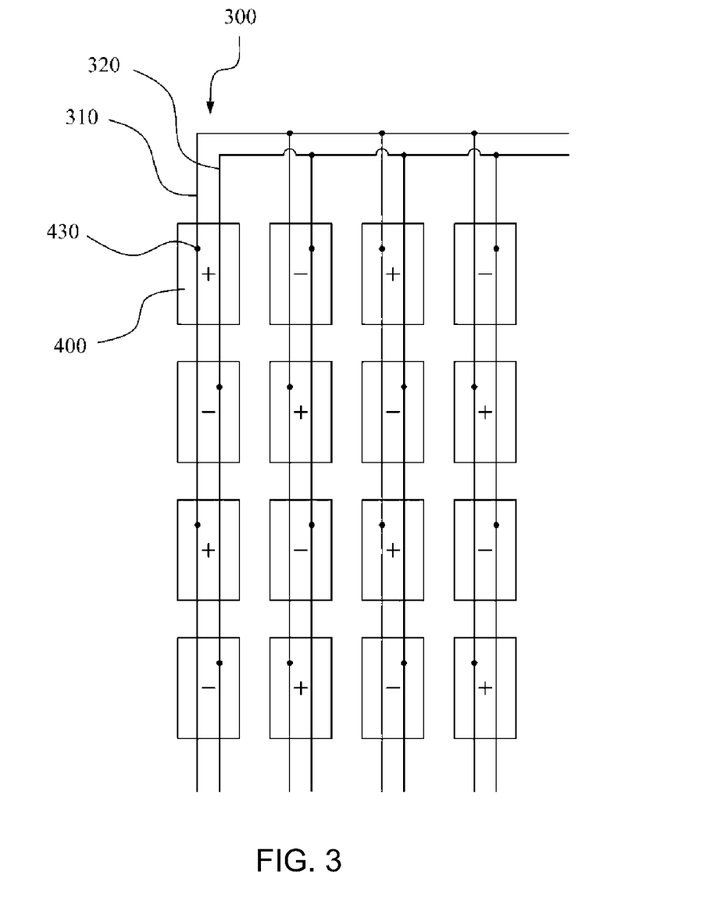
FIG. 3 is a partial circuit diagram of a plurality of share bar groups and a plurality of pixel units of the display panel of the present invention.
Figure 4:
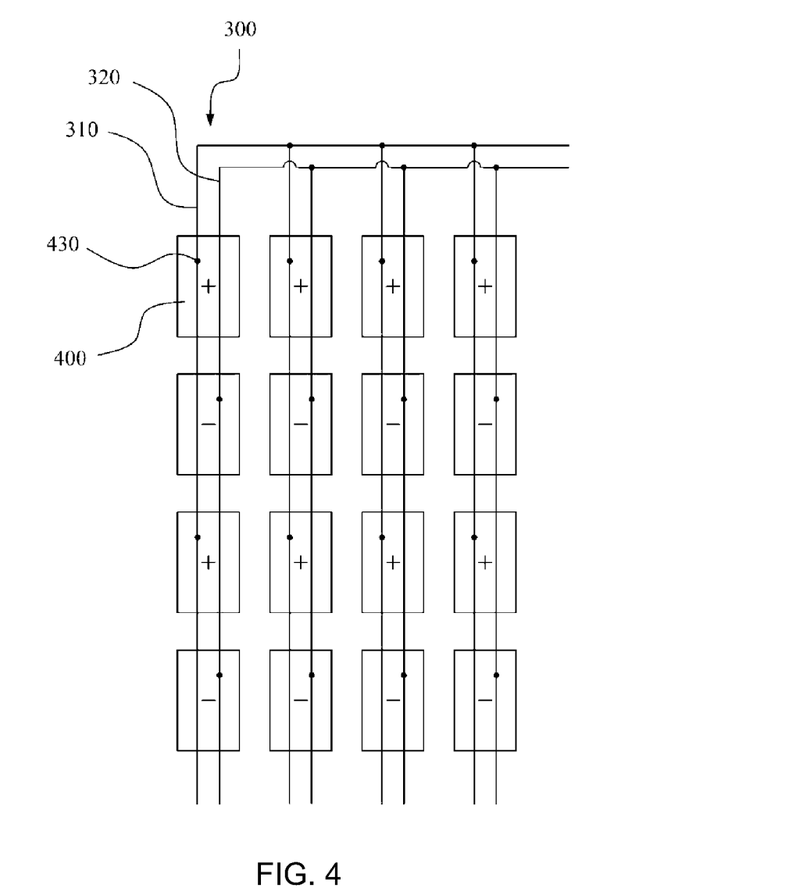
FIG. 4 is another partial circuit diagram of the share bar groups and the pixel units of the display panel of the present invention.

Please refer to FIGS. 3 and 4, which are partial circuit diagrams of the share bar groups 300 and the pixel units 400 of the display panel of the present invention. The present invention uses 4*4 pixel units 400 and four share bar groups 300 shown in FIGS. 3 and 4 as examples to illustrate relative relationships between the pixel units 400 and the share bar groups 300 in the display panel.

As shown in FIGS. 3 and 4, the first share bars 310 of the share bar groups 300 are electrically connected to each other, and the second share bars 320 of the share bar groups 300 are electrically connected to each other. In one column of the pixel units 400, the share thin-film transistors 430 of the pixel units 400 are electrically connected to a same one of the shar bar groups 300. In addition, in order to prevent the above-mentioned display abnormalities and delayed display problems, in one column of pixel units 400, ones of the share thin-film transistors 430 of every two adjacent pixel units 400 are electrically connected to the first share bar 310 of the same one of the shar bar groups 300, and the other ones of the share thin-film transistors 430 of every two adjacent pixel units 400 are electrically connected to the second share bar 320 of the same one of the shar bar groups 300.

In an embodiment, the partial circuit diagram of FIG. 3 shows the display panel adopting the dot inversion mode. The pixel units 400 in a first column from the left are four pixel units 400 sequentially having a positive polarity, a negative polarity, a positive polarity, and a negative polarity from the top to the bottom. The pixel units 400 in a second column from the left are four pixel units 400 sequentially having a negative polarity, a positive polarity, a negative polarity, and a positive polarity from the top to the bottom. The pixel units 400 in a third column from the left are four pixel units 400 sequentially having a positive polarity, a negative polarity, a positive polarity, and a negative polarity in order from the top to the bottom. The pixel units 400 in a fourth column from the left are the four pixel units 400 sequentially having a negative polarity, a positive polarity, a negative polarity, and a positive polarity from the top to the bottom.

As shown in FIG. 3, in one row of the pixel units 400, ones of the share thin-film transistors 430 of every two adjacent pixel units 400 are electrically connected to the first share bar 310 of one of the shar bar groups 300, and the other ones of the share thin-film transistors 430 of every two adjacent pixel units 400 are electrically connected to the second share bar 320 of the other one of the shar bar groups 300.

In this embodiment, whether in the pixel units 400 in each row or in the pixel units 400 in each column, one of two adjacent pixel units 400 has a positive polarity, and the other one of the two adjacent pixel units 400 has a negative polarity, and thus constitutes the display panel of the dot inversion mode. In addition, the pixel units 400 of the positive polarity are electrically connected to each other through the first share bars 310 of the share bar groups 300, and the pixel units 400 of the negative polarity are electrically connected to each other through the second share bars 320 of the share bar groups 300. In this way, the pixel units 400 of a same polarity can be electrically connected to each other, share a discharge voltage, and prevent the display abnormality and delayed display problems of the display panel.

In an embodiment, the partial circuit diagram of FIG. 4 shows the display panel adopting the row inversion mode. The pixel units 400 of each column are four pixel units 400 sequentially having a positive polarity, a negative polarity, a positive polarity, and a negative polarity from the top to the bottom.

As shown in FIG. 4, in one row of the pixel units 400, the share thin-film transistors 430 of the pixel units 400 are electrically connected to the first share bar 310 of each of the shar bar groups 300; or in one row of the pixel units 40, the share thin-film transistors 430 of the pixel units 400 are electrically connected to the second share bar 320 of each of the shar bar groups 300.

In this embodiment, in each one column of the pixel units 400, one of two adjacent pixel units 400 has a positive polarity, and the other one of the two adjacent pixel units 400 has a negative polarity, and in the pixel units 400 in a same row, each of the pixel units 400 has a same polarity. Therefore, the display panel of the dot inversion mode is constituted. In addition, the pixel units 400 of the positive polarity are electrically connected to each other through the first share bars 310 of the share bar groups 300, and the pixel units 400 of the negative polarity are electrically connected to each other through the second share bars 320 of the share bar groups 300. In this way, the pixel units 400 of a same polarity can be electrically connected to each other, share a discharge voltage, and prevent the display abnormality and delayed display problems of the display panel.

Figure 5:
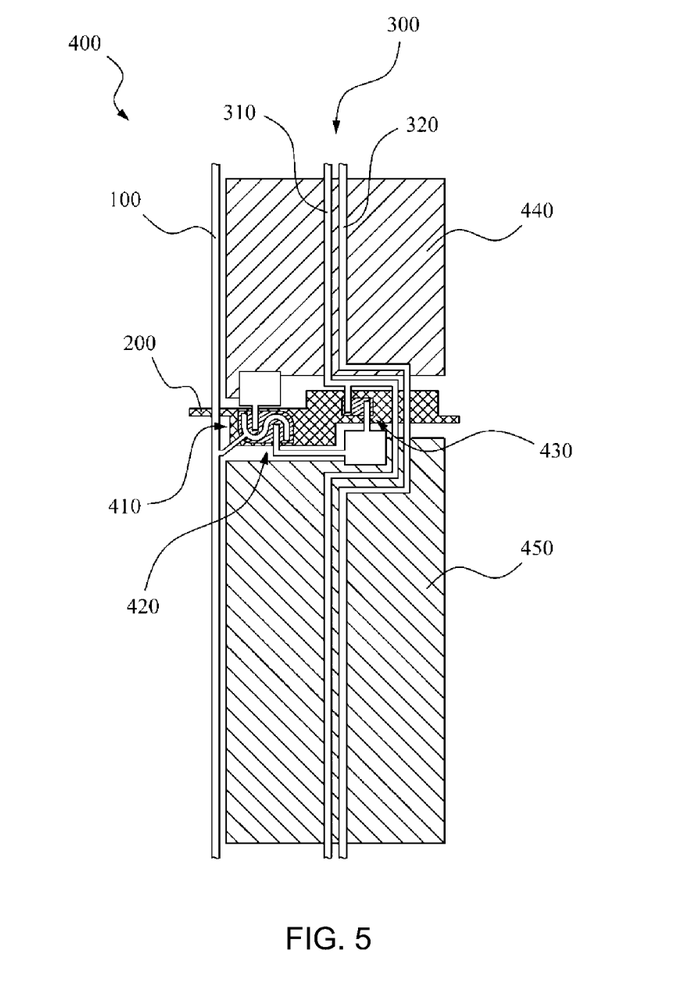
FIG. 5 is a partial structural schematic diagram of the present invention.
Figure 6:
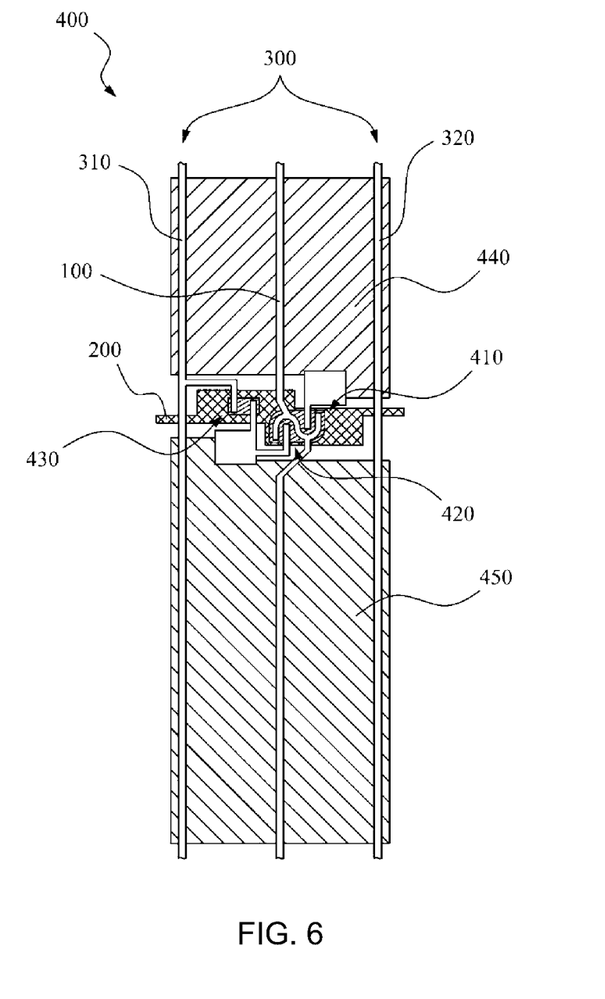
FIG. 6 is another partial structural schematic diagram of the present invention.

Please refer to FIGS. 5 and 6, which are partial structural schematic diagrams of the present invention. The present invention uses one data line 100, one scan line 200, one share bar group 300, and one pixel unit 400 shown in FIGS. 5 and 6 as an example to illustrate relative relationships between various components in the display panel.

As shown in FIGS. 5 and 6, each of the pixel units 400 further includes a first pixel electrode 440 and a second pixel electrode 450. The first pixel electrode 440 is electrically connected to the first thin-film transistor 410, and the second pixel electrode 450 is electrically connected to the second thin-film transistor 420.

It should be noted that FIGS. 5 and 6 only show one of the pixel units 400 with a positive polarity, that is, the first share bar 310 of one of the share bar groups 300 is electrically connected to one of the pixel units 400. A structure of one of the pixel units 400 with a negative polarity can be deduced according to descriptions of FIGS. 5 and 6 below.

In an embodiment, in one column of the pixel units 400, the first share bar 310 and the second share bar 320 of each of the share bar groups 300 are insulated from each other and are disposed in a middle region of the first pixel electrodes 440 and the second pixel electrodes 450 of the pixel units 400.

As shown in FIG. 5, the data line 100 is disposed on one side of the pixel unit 400, and the scan line 200 is disposed between the first pixel electrode 440 and the second pixel electrode 450. The first share bar 310 and the second share bar 320 of the share bar groups 300 are insulated from each other and are arranged side by side and on a center line of the first pixel electrode 440 and the second pixel electrode 450 of the pixel unit 400.

In one of the pixel units 400 with a positive polarity in this embodiment, the source of the first thin-film transistor 410 and the source of the second thin-film transistor 420 are electrically connected to one of the data lines 100. The gate of the first thin-film transistor 410, the gate of the second thin-film transistor 420, and the gate of the share thin-film transistor 430 are electrically connected to one of the scan lines 200. The source of the share thin-film transistor 430 is electrically connected to the drain of the second thin-film transistor 420. The drain of the share thin-film transistor 430 is electrically connected to the first share bar 310 of the share bar groups 300.

In an embodiment, in one column of the pixel units 400, the first share bar 310 and the second share bar 320 of each of the share bar groups 300 are insulated from each other and are disposed in edge regions of the first pixel electrodes 440 and the second pixel electrodes 450 of the pixel units 400.

As shown in FIG. 6, the data line 100 is disposed in a middle region of the pixel unit 400, and the scan line 200 is disposed between the first pixel electrode 440 and the second pixel electrode 450. The first share bar 310 and the second share bar 320 of one of the share bar groups 300 are respectively disposed on a left side and a right side of the first pixel electrode 440 and the second pixel electrode 450 of the pixel unit 400.

In one of the pixel units 400 with a positive polarity in this embodiment, the source of the first thin-film transistor 410 and the source of the second thin-film transistor 420 are electrically connected to one of the data lines 100. The gate of the first thin-film transistor 410, the gate of the second thin-film transistor 420, and the gate of the share thin-film transistor 430 are electrically connected to one of the scan lines 200. The source of the share thin-film transistor 430 is electrically connected to the drain of the second thin-film transistor 420. The drain of the share thin-film transistor 430 is electrically connected to the first share bar 310 of the share bar groups 300.

The embodiment shown in FIG. 5 disposes the first share bar 310 and the second share bar 320 of one of the share bar groups 300 side by side. The embodiment shown in FIG. 6 separates the first share bar 310 and the second share bar 320 of one of the share bar groups 300. Compared with the embodiment shown in FIG. 5, as the embodiment shown in FIG. 6 increases a distance between the first share bar 310 electrically connected to the pixel units 400 of the positive polarity and the second share bar 320 electrically connected to the pixel units 400 of the negative polarity, the first share bar 310 and the second share bar 320 are not prone to produce the capacitive coupling effect, which can achieve the desired display effects.

Figure 7:
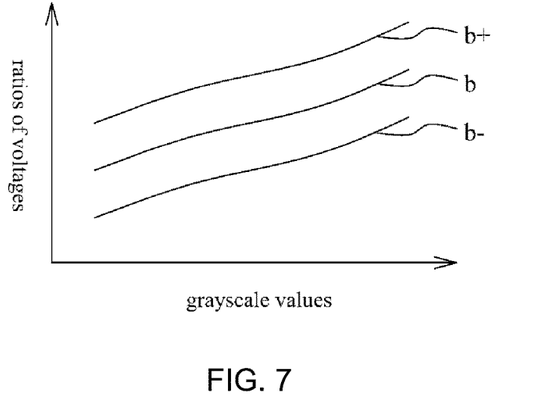
FIG. 7 is a graph of ratios of voltages of a second pixel electrode to voltages of a first pixel electrode in each of the pixel units of the display panel of the present invention at different grayscale values.

Please refer to FIG. 7, which is a graph of ratios of voltages of the second pixel electrode 450 to voltages of the first pixel electrode 440 in each of the pixel units 400 of the display panel of the present invention at different grayscale values. The display panel provided by the present invention can be applied to the display panel adopting the dot inversion mode and the display panel adopting the row inversion mode. With a cooperation of the pixel units 400 having a positive polarity and the pixel units 400 having a negative polarity, the graph as shown in FIG. 7 can be formed.

As shown in FIG. 7, ratios of voltages of the pixel units 400 of the positive polarity show an upward trend in a curve b+ at different grayscale values, and ratios of voltages of the pixel units 400 of the negative polarity also shows an upward trend in a curve b− at different grayscale values. Therefore, ratios of comprehensive voltages of the pixel units 400 of the positive polarity and the pixel units 400 of the negative polarity shows an upward trend in a curve b at different grayscale values, which meets the requirements of the gamma curve.

Therefore, the present invention not only increases the viewing angles of the display panel during a low grayscale display through the first share bars 310 and the second share bars 320 of the share bar groups 300, but also increases the light transmittance of the panel during a high grayscale display.

Figure 8:
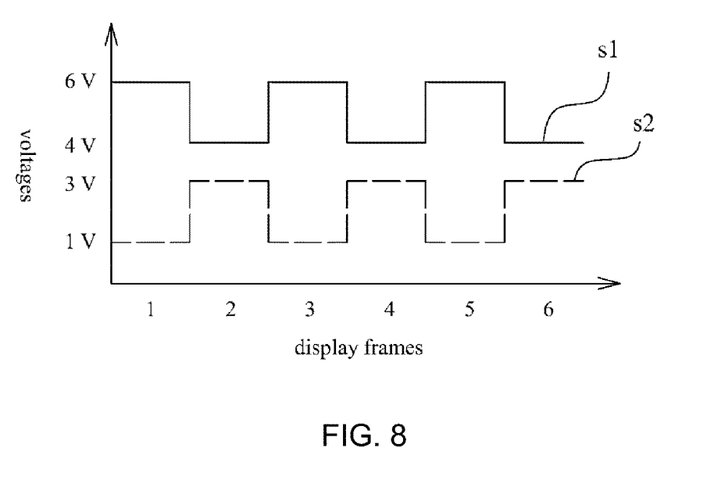
FIG. 8 is a graph of changes of a voltage of a first share bar and a voltage of a second share bar in each of the share bar groups of the display panel of the present invention corresponding to each of display frames.

Please refer to FIG. 8, which is a graph of changes of a voltage of the first share bar 310 and a voltage of the second share bar 320 in each of the share bar groups 300 of the display panel of the present invention corresponding to each of display frames.

In an embodiment, as shown in FIG. 8, shared discharge voltages of the first share bars 310 corresponds to a line s1 of the display frames, and shared discharge voltages of the second share bars 320 corresponds to a line s2 of the display frames. In the line s1, the first share bars 310 have two shared discharge potentials, which are 6 V and 4 V. In the line s2, the second share bars 320 have two shared discharge potentials, which are 3 V and 1 V.

In this embodiment, benefit from technical effects produced by the first share bars 310 and the second share bars 320 of the share bar groups 300, in each of the display frames, the shared discharge voltages generated by the first share bars 310 and the second share bars 320 can offset each other, so the display panel is not prone to generate the capacitive coupling effect, thereby achieving the desired display effects.

Figure 9:
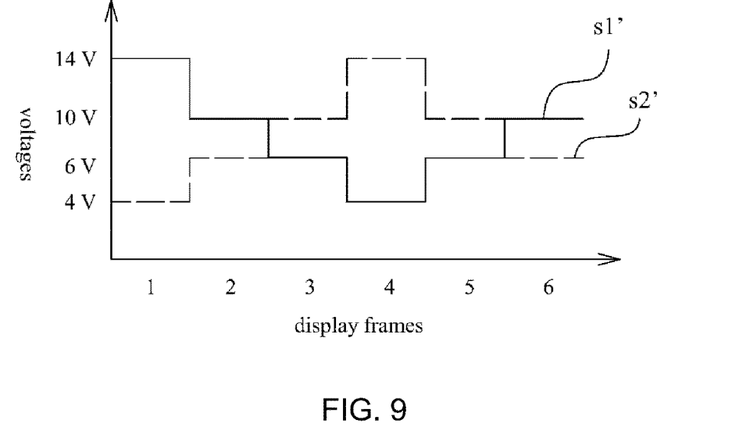
FIG. 9 is another graph of changes of a voltage of a first share bar and a voltage of a second share bar in each of the share bar groups of the display panel of the present invention corresponding to each of display frames.

Please refer to FIG. 9, which is another graph of changes of a voltage of the first share bar 310 and a voltage of the second share bar 320 in each of the share bar groups 300 of the display panel of the present invention corresponding to each of display frames.

In an embodiment, as shown in FIG. 9, shared discharge voltages of the first share bars 310 corresponds to a line s1' of the display frames, and shared discharge voltages of the second share bars 320 corresponds to a line s2' of the display frames. In the line s1', the first share bars 310 have a plurality of shared discharge potentials, which are 14 V, 10 V, 6 V, and 4 V. In the line s2', the second share bars 320 have a plurality of shared discharge potentials, which are 14 V, 10 V, 6 V, and 4 V.

In this embodiment, benefit from technical effects produced by the first share bars 310 and the second share bars 320 of the share bar groups 300, in each of the display frames, the shared discharge voltages generated by the first share bars 310 and the second share bars 320 can offset each other, so the display panel is not prone to generate the capacitive coupling effect, thereby achieving the desired display effects. Furthermore, compared with the embodiment shown in FIG. 8, the shared discharge voltages generated by the first share bars 310 and the second share bars 320 in this embodiment has a relatively small variation range between the display frames. Therefore, in each of the pixel units 400, the ratios of the voltages of the second pixel electrode 450 to the voltages of the first pixel electrode 440 can be adjusted more significantly. By further adjusting the ratios, the display panel is less likely to produce the capacitive coupling effect, thereby achieving the desired display effects.

The invention further provides a display device. The display device includes the display panel in any one of the above embodiments. The display panel may be a smart phone, a tablet computer, a laptop computer, a digital camera, a digital video camera, a smart wearable device, a car monitor, a television, or an e-book reader to which the display panel is applied.

The display panel and the display device of the present invention are provided with the share thin-film transistor 430 of each of the pixel units 400 and the first share bar 310 and the second share bar 320 of each of the share bar groups 300 to prevent the color shift problem from occurring to the display panel. Therefore, the viewing angles of the display panel during the low grayscale display is increased, and the light transmittance of the display panel during the high grayscale display is increased. Furthermore, the display panel can further be applied to the display device adopting the dot inversion mode and the display device adopting the row inversion mode. In the display panel with frequent signal communication, the display panel can reduce the capacitive coupling effect generated by each of the share bar groups 300 and the pixel units 400, thereby achieving the desired display effects, such as low color shift, wide viewing angles during the low grayscale display, and high light transmittance in the high grayscale display.

The description above are only preferred embodiments of the invention. It should be pointed out that to those of ordinary skill in the art, various improvements and embellishments may be made without departing from the principle of the present invention, and these improvements and embellishments are also deemed to be within the scope of protection of the present invention.

What is claimed is:

1. A display panel, comprising:
    a plurality of data lines;
    a plurality of scan lines;
    a plurality of share bar groups; and
    a plurality of pixel units, wherein each of the pixel units comprises a first thin-film transistor, a second thin-film transistor, and a share thin-film transistor, the first thin-film transistor and the second thin-film transistor are electrically connected to a same one of the data lines, the first thin-film transistor, the second thin-film transistor, and the share thin-film transistor are electrically connected to a same one of the scan lines, and the share thin-film transistor is electrically connected to the second thin-film transistor;
    wherein each column of the pixel units shares a same one of the share bar groups, and each of the share bar groups comprises a first share bar and a second share bar; and
    in one column of the pixel units, one of the share thin-film transistors of any two adjacent pixel units is electrically connected to the first share bar of a corresponding one of the share bar groups, and the other one of the share thin-film transistors of the any two adjacent pixel units is electrically connected to the second share bar of the corresponding one of the share bar groups.

2. The display panel according to claim 1, wherein the first share bars of the plurality of share bar groups are electrically connected to each other, and the second share bars of the plurality of share bar groups are electrically connected to each other; and
    in each frame of the display panel, shared discharge voltages generated by the first share bars of the plurality of share bar groups and shared discharge voltages generated by the second share bars of the plurality of share bar groups offset each other.

3. The display panel according to claim 2, wherein a source of the first thin-film transistor and a source of the second thin-film transistor are electrically connected to the same one of the data lines, a gate of the first thin-film transistor, a gate of the second thin-film transistor, and a gate of the share thin-film transistor are electrically connected to the same one of the scan lines, a source of the share thin-film transistor is electrically connected to a drain of the second thin-film transistor, and a drain of the share thin-film transistor is electrically connected to one of the first share bar and the second share bar of the corresponding one of the share bar groups.

4. The display panel according to claim 2, wherein each of the pixel units further comprises a first pixel electrode and a second pixel electrode, the first pixel electrode is electrically connected to the first thin-film transistor, and the second pixel electrode is electrically connected to the second thin-film transistor.

5. The display panel according to claim 4, wherein in one column of the pixel units, the first share bar and the second share bar of the corresponding one of the share bar groups are insulated from each other and are disposed in a middle region of the first pixel electrodes and the second pixel electrodes of the pixel units.

6. The display panel according to claim 5, wherein in the one column of the pixel units, the first share bar and the second share bar of the corresponding one of the share bar groups are insulated from each other and are disposed on a center line of the first pixel electrodes and the second pixel electrodes of the pixel units.

7. The display panel according to claim 4, wherein in one column of the pixel units, the first share bar and the second share bar of the corresponding one of the share bar groups are insulated from each other and are disposed in edge regions of the first pixel electrodes and the second pixel electrodes of the pixel units.

8. The display panel according to claim 7, wherein in the one column of the pixel units, the first share bar and the second share bar of the corresponding one of the share bar groups are insulated from each other and are disposed at two opposite sides of the first pixel electrodes and the second pixel electrodes of the pixel units.

9. The display panel according to claim 2, wherein the display panel comprises N display frames, where N is greater than or equal to 4; and
the first share bar comprises a plurality of first shared discharge potentials, and the plurality of first shared discharge potentials gradually decrease from a first frame to a fourth frame; the second share bar comprises a plurality of second shared discharge potentials, and the plurality of second shared discharge potentials gradually increase from the first frame to the fourth frame.

10. The display panel according to claim 1, wherein in one row of the pixel units, one of the share thin-film transistors of any two adjacent pixel units is electrically connected to the first share bar of its corresponding one of the share bar groups.

11. The display panel according to claim 10, wherein in the one row of the pixel units, the other one of the share thin-film transistors of any two adjacent pixel units is electrically connected to the second share bar of its corresponding one of the share bar groups.

12. The display panel according to claim 1, wherein in one row of the pixel units, each of the share thin-film transistors of the pixel units is electrically connected to the first share bar of its corresponding one of the share bar groups.

13. The display panel according to claim 1, wherein in one row of the pixel units, each of the share thin-film transistors of the pixel units is electrically connected to the second share bar of its corresponding one of the share bar groups.

14. A display device, comprising a display panel, wherein the display panel is driven by the display device through a dot inversion mode or a row inversion mode, and the display panel comprises:
a plurality of data lines;
a plurality of scan lines;
a plurality of share bar groups;
a plurality of pixel units, wherein each of the pixel units comprises a first thin-film transistor, a second thin-film transistor, and a share thin-film transistor, the first thin-film transistor and the second thin-film transistor are electrically connected to a same one of the data lines, the first thin-film transistor, the second thin-film transistor, and the share thin-film transistor are electrically connected to a same one of the scan lines, and the share thin-film transistor is electrically connected to the second thin-film transistor;
wherein each column of the pixel units shares a same one of the share bar groups, and each of the share bar groups comprises a first share bar and a second share bar; and
in one column of the pixel units, one of the share thin-film transistors of any two adjacent pixel units is electrically connected to the first share bar of a corresponding one of the share bar groups, and the other one of the share thin-film transistors of the any two adjacent pixel units is electrically connected to the second share bar of the corresponding one of the share bar groups.

15. The display device according to claim 14, wherein the first share bars of the plurality of share bar groups are electrically connected to each other, and the second share bars of the plurality of share bar groups are electrically connected to each other; and
in each frame of the display panel, shared discharge voltages generated by the first share bars of the plurality of share bar groups and shared discharge voltages generated by the second share bars of the plurality of share bar groups offset each other.

16. The display device according to claim 15, wherein a source of the first thin-film transistor and a source of the second thin-film transistor are electrically connected to the same one of the data lines, a gate of the first thin-film transistor, a gate of the second thin-film transistor, and a gate of the share thin-film transistor are electrically connected to the same one of the scan lines, a source of the share thin-film transistor is electrically connected to a drain of the second thin-film transistor, and a drain of the share thin-film transistor is electrically connected to one of the first share bar and the second share bar of the corresponding one of the share bar groups.

17. The display device according to claim 15, wherein each of the pixel units further comprises a first pixel electrode and a second pixel electrode, the first pixel electrode is electrically connected to the first thin-film transistor, and the second pixel electrode is electrically connected to the second thin-film transistor.

18. The display device according to claim 15, wherein the display panel comprises N display frames, where N is greater than or equal to 4; and
the first share bar comprises a plurality of first shared discharge potentials, and the plurality of first shared discharge potentials gradually decrease from a first frame to a fourth frame; the second share bar comprises a plurality of second shared discharge potentials, and the plurality of second shared discharge potentials gradually increase from the first frame to the fourth frame.

19. A display panel, comprising:
a plurality of data lines;
a plurality of scan lines;
a plurality of share bar groups, wherein each of the share bar groups comprises a first share bar and a second share bar; and a plurality of pixel units, wherein each column of the pixel units shares a same one of the share bar groups, each of the pixel units comprises a first thin-film transistor, a second thin-film transistor, and a share thin-film transistor, the first thin-film transistor and the second thin-film transistor are electrically connected to a same one of the data lines, the first thin-film transistor, the second thin-film transistor, and the share thin-film transistor are electrically connected to a same one of the scan lines, and the share thin-film transistor is electrically connected to the second thin-film transistor and one of the first share bar and the second share bar of a corresponding one of the share bar groups;

wherein the display panel comprises N display frames, where N is greater than or equal to 4; and the first share bar comprises a plurality of first shared discharge potentials, and the plurality of first shared discharge potentials gradually decrease from a first frame to a fourth frame; the second share bar comprises a plurality of second shared discharge potentials, and the plurality of second shared discharge potentials gradually increase from the first frame to the fourth frame.

20. The display panel according to claim 19, wherein the first share bars of the plurality of share bar groups are electrically connected to each other, and the second share bars of the plurality of share bar groups are electrically connected to each other;

in each of the display frames, shared discharge voltages generated by the first share bars of the plurality of share bar groups and shared discharge voltages generated by the second share bars of the plurality of share bar groups offset each other.

* * * * *